(12) United States Patent
Funk

(10) Patent No.: US 8,036,862 B2
(45) Date of Patent: Oct. 11, 2011

(54) CREATION OF A LINEAR OR PLANAR SHAPE

(76) Inventor: Wolfgang Funk, Aschaffenburg (DE)

( * ) Notice: Subject to any disclaimer, the term of this patent is extended or adjusted under 35 U.S.C. 154(b) by 302 days.

(21) Appl. No.: 12/204,309

(22) Filed: Sep. 4, 2008

(65) Prior Publication Data

US 2009/0070075 A1 Mar. 12, 2009

Related U.S. Application Data

(63) Continuation of application No. PCT/EP2007/002073, filed on Mar. 5, 2007.

(30) Foreign Application Priority Data

Mar. 6, 2006 (DE) .......................... 10 2006 010 610

(51) Int. Cl.
*G06F 7/60* (2006.01)
*G06F 19/00* (2011.01)
(52) U.S. Cl. ........................................... 703/2; 700/189
(58) Field of Classification Search ....... 703/2; 700/189
See application file for complete search history.

(56) References Cited

U.S. PATENT DOCUMENTS

| 5,726,896 | A | 3/1998 | Jia et al. |
| 6,628,802 | B1 * | 9/2003 | Braudaway et al. .......... 382/100 |
| 6,678,378 | B1 * | 1/2004 | Akiyoshi ........................ 380/54 |
| 6,904,394 | B2 | 6/2005 | Jaffrey |
| 6,956,568 | B2 * | 10/2005 | Maekawa et al. ............. 345/420 |
| 7,366,909 | B2 * | 4/2008 | Zhou et al. .................... 713/176 |

(Continued)

FOREIGN PATENT DOCUMENTS

KR  10 2003 0095 476 A  12/2003

OTHER PUBLICATIONS

Ohbuchi, et al., "Managing CAD Data as a Multimedia Data Type Using Digital Watermarking", IFIP WG 5.2 Fourth Workshop on Knowledge Intensive CAD, May 22-24, 2000, pp. 1-13, Parma, Italy.

(Continued)

*Primary Examiner* — Paul Rodriguez
*Assistant Examiner* — Juan C Ochoa
(74) *Attorney, Agent, or Firm* — Laurence A. Greenberg; Werner H. Stemer; Ralph E. Locher

(57) ABSTRACT

A watermark is embossed into a model of a linear or surface shape, especially a non-uniform rational B-splines model. The model has a plurality of splines, the combination of which forms the shape. Control points are assigned to the splines such that a course of the respectively associated spline can be modified and thus be controlled by changing the position of the control points and/or weights of the control points. Nodes which are located in a section of the shape that is formed by the respectively associated spline are allocated to the splines. In order to change the shape (the modified curve runs through point $C_{mod}$) when a watermark is embossed into the model, the position of at least one control point is modified, the weight by which a control point affects the shape and thus influences at least one area of the shape is modified, and/or an additional control point is inserted into the model. At least one additional node is inserted into the model (new node at u=1.1875 on the modified curve) in order to obtain information on how the change of the shape can be reversed.

9 Claims, 6 Drawing Sheets

U.S. PATENT DOCUMENTS

Figure 1:
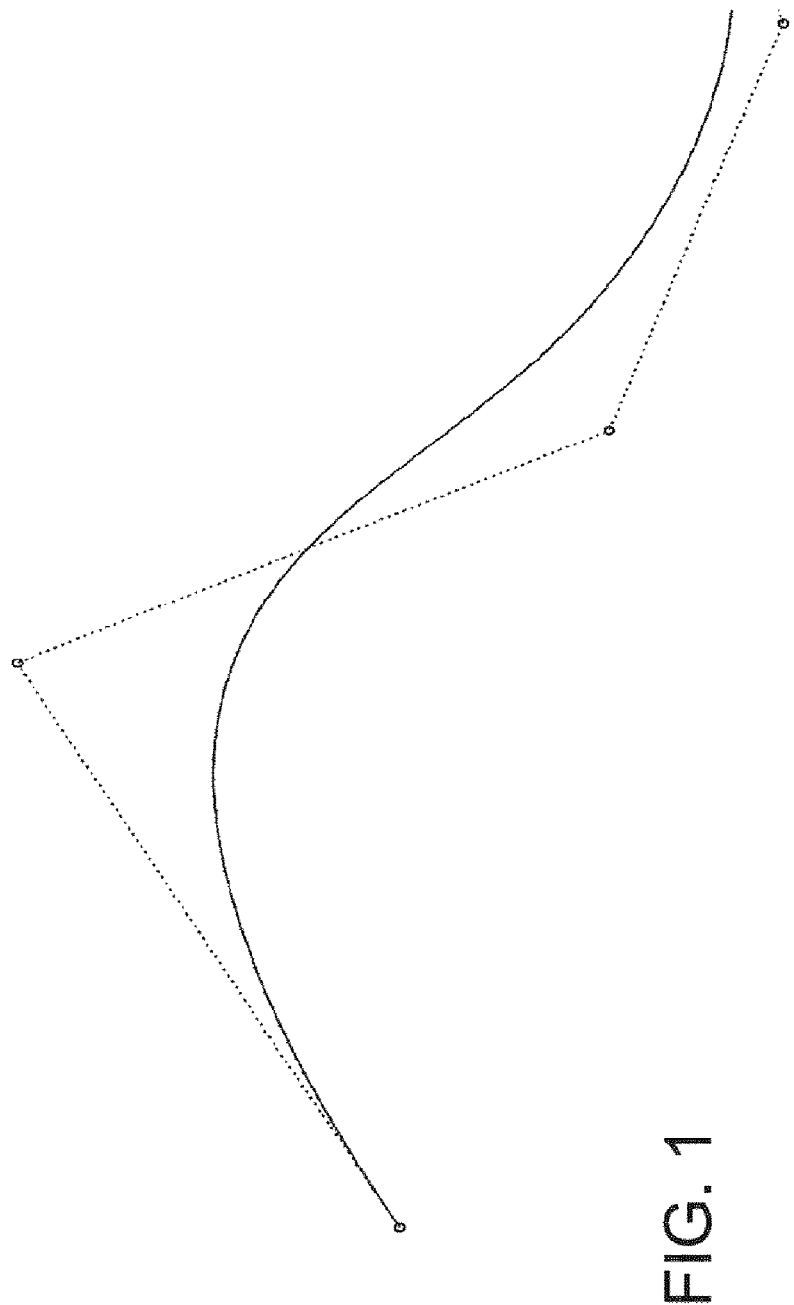

2009/0169050 A1* 7/2009 Wolter et al. ............... 382/100

OTHER PUBLICATIONS

Ohbuchi, et al., "A Shape-Preserving Data Embedding Algorithm for NURBS Curves and Surfaces", Transactions of the Information Processing Society of Japan, vol. 41, No. 3, Mar. 2000, pp. 559-569.

Praun, et al., "Robust Mesh Watermarking", Proceedings of the Conference on Computer Graphics (SIGGRAPH '99), ACM Press, pp. 49-56.

Lee, et al., "Watermarking Algorithms for 3D NURBS Graphic Data", EURASIP Journal on Applied Signal Processing, 14 (2004), pp. 2142-2152.

Lee, et al. "Watermarking for 3D NURBS Graphic Data", Proceedings of the 2002 IEEE Workshop on Multimedia Signal Processing (Cat. No. 02TH8661) IEEE Piscataway, NJ, USA, 2002, pp. 304-307.

Benedens, O., "Affine Invariant Watermarks for 3D Polygonal and NURBS based Models", Lecture Notes in Computer Science, vol. 1975 (2000), pp. 15-29.

Piegl, L., "Modifying the shape rational B-splines, Part 1: curves", Computer Aided Design vol. 21, No. 8 (199), pp. 509-518.

Piegl, L., "Modifying the shape rational B-splines, Part 2: surfaces", Computer Aided Design vol. 21, No. 9 (1989), pp. 538-546.

Hartley, R., et al., "Multiple View Geometry in Computer Vision", Cambridge University Press (Jun. 2000), pp. 152-184.

Piegl, L., et al., "The NURBS Book", Springer Verlag (1995), ISBN 3540615458, pp. 141-188.

Fornaro, C., et al., "Public key watermarking for authentication of CSG models", Computer-Aided Design vol. 32, No. 12 (2000), pp. 724-735.

Written Opinion of the International Searching Authority dated Oct. 14, 2008.

* cited by examiner

CREATION OF A LINEAR OR PLANAR SHAPE

The invention relates to a method and an arrangement for producing industrial goods or other items, in particular motor vehicle bodies. Having the design of a linear or surface shape of the item, a watermark is embossed into a model of the linear or surface shape. The model is, in particular, a NURBS (Non-Uniform Rational B Splines) model. The term "model of a linear or surface shape" also includes topological surface or volume models (so-called "boundary representation" or "B-Rep") that define a surface or a volume via the delimiting lines or surfaces.

Digital models have been in use for some years for designing industrial goods and other items. Such models frequently describe contours or surfaces of items such as, for example, motor vehicle bodies, which are intended to be developed by various users in various stages of planning and design, and be used. In industrial sectors such as the automobile industry, the tracking of the distribution paths of digital models is increasingly being recognized as necessary for reasons of security. In particular, the aim is to be able to identify at which point in the process chain valuable design information has been passed on to unauthorized third parties from the defined work sequence of the design.

By using a personalized digital watermark (that is to say one that is assigned to a person or, alternatively, to a process step in the process chain) in copies of the original model, it is possible for these to be assigned uniquely at a later time to a delivery point (for example a supplier, subcontractor, etc.).

The original models are mostly devised with the aid of computer aided design (CAD) systems and are typically to hand in the form of three-dimensional data records that are represented in many instances as curves or surfaces in the form of NURBS. The NURBS models are passed on wholly or as submodels to contractors, suppliers, advertising agencies and other partners. Precisely in the automobile industry, the premature publication of new designs entails a high risk of loss, since the selling of current product lines is negatively influenced.

An NURBS curve C(u) is defined by its degree p, a set of weighted control points Pi and a node vector U. NURBS curves and surfaces are generalizations both of B splines and of Bézier curves and surfaces. The main difference between these two types of spline is the weighting of the control points with the weights wi. The weights wi render NURBS curves rational (irrational B splines are a special case of rational B splines).

An NURBS curve is completely defined via the sum of the control points $$C(u) = \sum_{i=0}^{n} R_{i,p}(u) P_i$$

weighted with rational B-spline base functions Ri,p. The rational B-spline base function Ri,p is calculated from B-spline base functions Ni,p of the order of NURBS p and the weights wi pertaining to the control points, the result being $$R_{i,p}(u) = \frac{N_{i,p}(u) w_i}{\sum_{j=0}^{n} N_{j,p}(u) w_j}.$$

In the region of the node vector $$U = \{\underbrace{a, \ldots, a}_{p+1}, u_{p+1}, \ldots, u_{r-p-1}, \underbrace{b, \ldots, b}_{p+1}\}$$

of length r+1, the parameter u∈[a,b] activates the individual segments of the spline curve. The elements of the node vector are monotonically rising. The nodes with the indices p+1 to r−p−1 are also denoted as internal nodes.

The node vector consists of parameter values that define the influence of the control points on the NURBS curve. The number of the nodes is always equal to the number of the control points plus the degree of the curve plus one. For example, a curve of third degree with five control points has nine nodes (5+3+1=9), one of which is an internal node.

The values of the node vector must be present in a rising sequence. Consequently, U={0,0,1,2,3,3} is valid, while {0,0,2,1,3,3}, by contrast, is not. The individual node values make no statement on their own; it is purely and simply the ratios of the differences between the node values that have a significance. Consequently, the node vectors {0,0,1,2,3,3}, {0,0,2,4,6,6} and {1,1,2,3,4,4} all yield the same curve. Furthermore, the multiplicity of an internal node may at most be as high as the degree of the curve (no internal node may occur more often than the degree of the curve). For NURBS of first degree, each internal node is paired with exactly one control point.

The order of an NURBS curve is fixed by the number of neighboring control points that influence the curve. The curve is composed mathematically of polynomials whose degree is one lower than the order of the curve. Thus, curves of second degree (which are represented by linear polynomials) are termed linear curves, curves of third degree are termed quadratic curves, and curves of fourth degree are termed cubic curves. The number of the control points must be greater than or equal to the order of the curve.

Methods for introducing information and data into a model have been proposed in the literature (for example, Ryutarou Ohbuchi, Hiroshi Masuda: "Managing CAD Data as a Multimedia Data Type Using Digital Watermarking", appearing in: Umberto Cugini, Michael J. Wozny (Publisher): From Knowledge Intensive CAD to Knowledge Intensive Engineering, IFIP TC5 WG5.2 Fourth Workshop on Knowledge Intensive CAD, 22 to 24 May 2000, Parma, Italy. IFIP Conference Proceedings 207 Kluwer 2001, ISBN 0-7923-7619-6), but they do not lead to any change in the shape defined by the model. Such information is also denoted in the literature as watermark. However, in this description embossing the watermark is understood to mean that the shape is at least slightly varied, and the watermark can therefore be detected in principle from the shape. Original data material is varied in any case such that an item of information is coded in the original data by the changes. Since the model is generally represented by digital data, it is also possible to speak of digital watermarks. A watermark can be, in particular, a change in shape that is characteristic per se as in the case of the classical watermark of a paper. It can be embossed in an identical or similar way into various models, for example as a bit sequence.

The named publication by Ohbuchi also describes the embossing of watermarks by varying the shape. In this case, the modulation of control points and/or of weights, and the variation in the values of a node vector are named as possible measures. These measures refer to NURBS models.

However, no variations in shape are to be present anymore at the latest when the model is used in the production of objects. It is therefore desirable that changes in shape undertaken can be reversed in the simplest possible way. Such a watermark is denoted as reversible. On the other hand, this is opposed by the requirement that the possibility of removing the watermark be restricted to authorized persons. A further requirement placed on a method for embossing watermarks is that the usefulness of the model for the envisaged object also may not be restricted before the removal of the watermark.

It is an object of the present invention to specify a method and an arrangement that, in the design of a linear or surface shape of an item, are capable of embossing a watermark into a model of the linear or surface shape such that the watermark can be completely removed, and the shape can therefore be produced without a variation brought about by the watermark.

The invention relates, in particular, to a model with a plurality of splines that form the shape in their totality, the splines being assigned control points such that it is possible to vary, and thereby control, a profile of the respectively assigned spline by varying the position of the control points. As an option, it is possible to define for each or some of the control points a weight with the aid of which it acts on the course of the curve. It is then possible as an alternative or in addition to control the course by varying the respective weight of the control point. Moreover, the splines are assigned nodes that lie on a part of the shape formed by the respectively assigned spline. The continuity can consist, for example, only in that no steps are formed at the transitions. Higher orders of continuity are, however, the tangential continuity, which also excludes bent profiles at the transitions, and the continuity of curvature, which does not permit any sudden change in curvature at the respective transition.

A model defined by NURBS and/or B splines is a model such as described in the foregoing paragraph. In particular, the nodes can depend on at least one parameter that controls properties of the model, for example controls a continuity of a profile of the shape in the case of the transition of one spline to a neighboring spline.

It is proposed to vary the shape by one or more of the following measures during embossing of a watermark into the model:
a) the position of at least one control point is varied,
b) a weight with which a control point affects the shape and influences at least one area of the shape by the action on the shape is varied for at least one control point, and/or
c) at least one additional control point is inserted into the model.

Measure b) cannot be applied in the case of specific types of spline models, since their control points exhibit no weights but, for example, lie directly on the curve or surface that are defined by the splines.

Furthermore, it is proposed that an item of information relating to how the variation in the shape can be reversed (such an item of information is denoted below as variation information) be introduced by inserting at least one additional node into the model.

Since the variation information is contained in the model itself, the reversal of the variation is facilitated. On the other hand, the reversal requires at least the knowledge of the way in which the variation information has been introduced by inserting the at least one additional node into the model. There are various possibilities to this end, and these will be examined in more detail.

The variation information can also be denoted as information relating to at least a portion of the variations undertaken. When a variation is reversible, this is equivalent to an item of information as to how the variation can be reversed.

It is not mandatory for the variation information to contain the complete information as to how the variation can be reversed. Rather, it is preferred that the variation cannot be reversed solely with the aid of the variation information introduced into the model. For example, a key (for example a digital code) can additionally further be necessary.

In a particular refinement of the method, a logical assignment of a control point which, or whose weight, is used in executing one or more of the measures a) to c) to the additionally inserted node with the aid of which the variation information corresponding to the variation via the control point is introduced into the model is therefore done by using a key.

The key can then be made available to an authorized user and/or to an automatically operating apparatus for removing (extracting) the watermark.

Irrespective of whether such a key is used or not, the extraction device can be, for example, part of an arrangement that has a control device for controlling the production of an item (for example in an industrial production plant). The control device is configured to evaluate the model and to generate control commands that prompt a production device to produce an item shaped in accordance with the model. The extraction device is part of the control device, or is combined therewith and is configured to evaluate the variation information automatically with the aid of the additional node/nodes and to reverse the variation in the shape.

In accordance with a particularly preferred refinement, a binary code with at least one bit is prescribed, the binary code being intended to be coded by embossing the watermark into the model. The bit can assume a first value and a second value. The bit is coded by a local displacement of the shape transverse to the profile of the shape by executing one or more of the measures a) to c) in claim 1, such that the local displacement in a first direction codes the first value, and the local displacement in a second direction, opposite to the first direction, codes the second value.

It is expressly pointed out herewith that the binary coding can also be undertaken without inserting additional nodes, that is to say even whenever the variation information is not introduced into the model by inserting nodes.

A binary coding of a watermark is particularly robust, since it is generally still uniquely recognizable even after the model has been passed on and further processed. It is of no significance for the respective value of the bit whether the shape has varied slightly in the case of the further processing, as long as the direction of the variation is maintained by comparison with the original state. For example, the binary code can therefore be reliably determined by comparison with the original shape (so-called nonblind method of detecting a watermark).

Furthermore, the invention embraces an arrangement for embossing watermarks into a model of a linear or surface shape, in particular into an NURBS (Non-Uniform Rational B Splines) model, the model having a plurality of splines that form the shape in their totality, the splines being assigned control points such that it is possible to vary, and thereby control, a profile of the respectively assigned spline by varying the position of the control points and/or of weights of the control points, and the splines being assigned nodes that lie on a part of the shape formed by the respectively assigned spline. The arrangement has a variation device that is configured to vary the shape by one or more of the following measures during embossing of a watermark into the model:
 a) the position of at least one control point is varied,
 b) a weight with which a control point affects the shape and thus influences at least one area of the shape is varied for at least one control point, and/or
 c) at least one additional control point is inserted into the model.

The variation device is configured to introduce an item of information relating to how the variation in the shape can be reversed (variation information) by inserting at least one additional node into the model.

Furthermore, the invention also embraces a computer program that, when run on a computer or computer network, executes the inventive method in one of its refinements.

Furthermore, the invention embraces a computer program having program code means in order to carry out the inventive method in one of its refinements when the program is executed on a computer or computer network. In particular, the program code means can be stored on a computer-readable data medium.

Furthermore, the invention embraces a data medium on which there is stored a data structure that can execute the inventive method in one of its refinements after being loaded into a user and/or main memory of a computer or computer network.

The invention also embraces a computer program product having program code means stored on a machine-readable medium, in order to carry out the inventive method in one of its refinements when the program is executed on a computer or computer network.

In this case, a computer program product is understood to mean the program as a saleable product. It can fundamentally be present in any desired form and for example on paper or a computer-readable data medium, and can, in particular, be distributed over a data transmission network.

When the inventive method is executed on a computer, it is possible for the computer, under the control of a computer program and/or of a structure of an appropriately configured microelectronic component (for example an FGPA, Field Programmable Gate Array), to insert the at least one control point, and/or vary its weight and, moreover, for it to introduce the variation information into the model by inserting the additional node.

Figure 3:
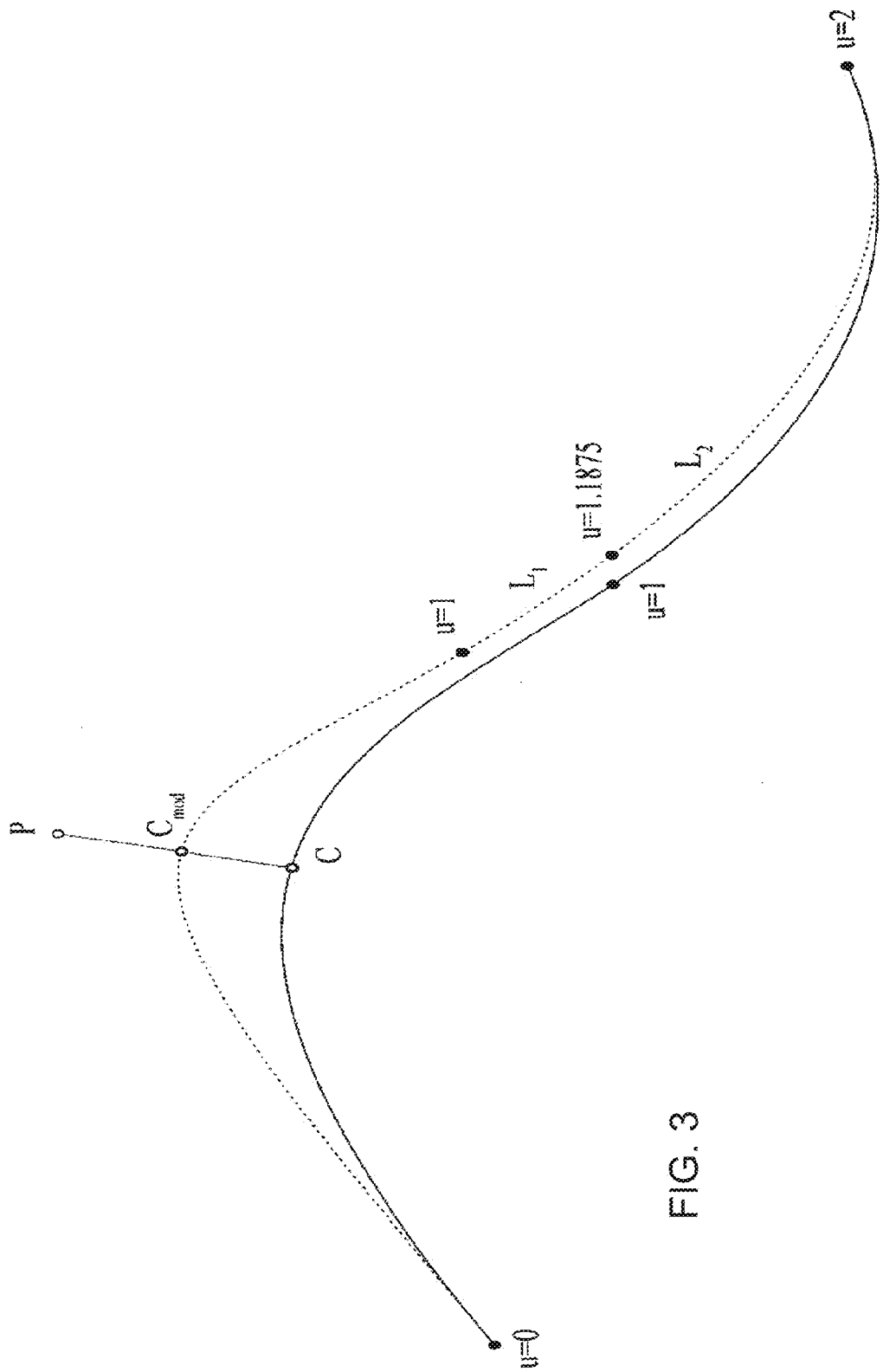
Figure 4:
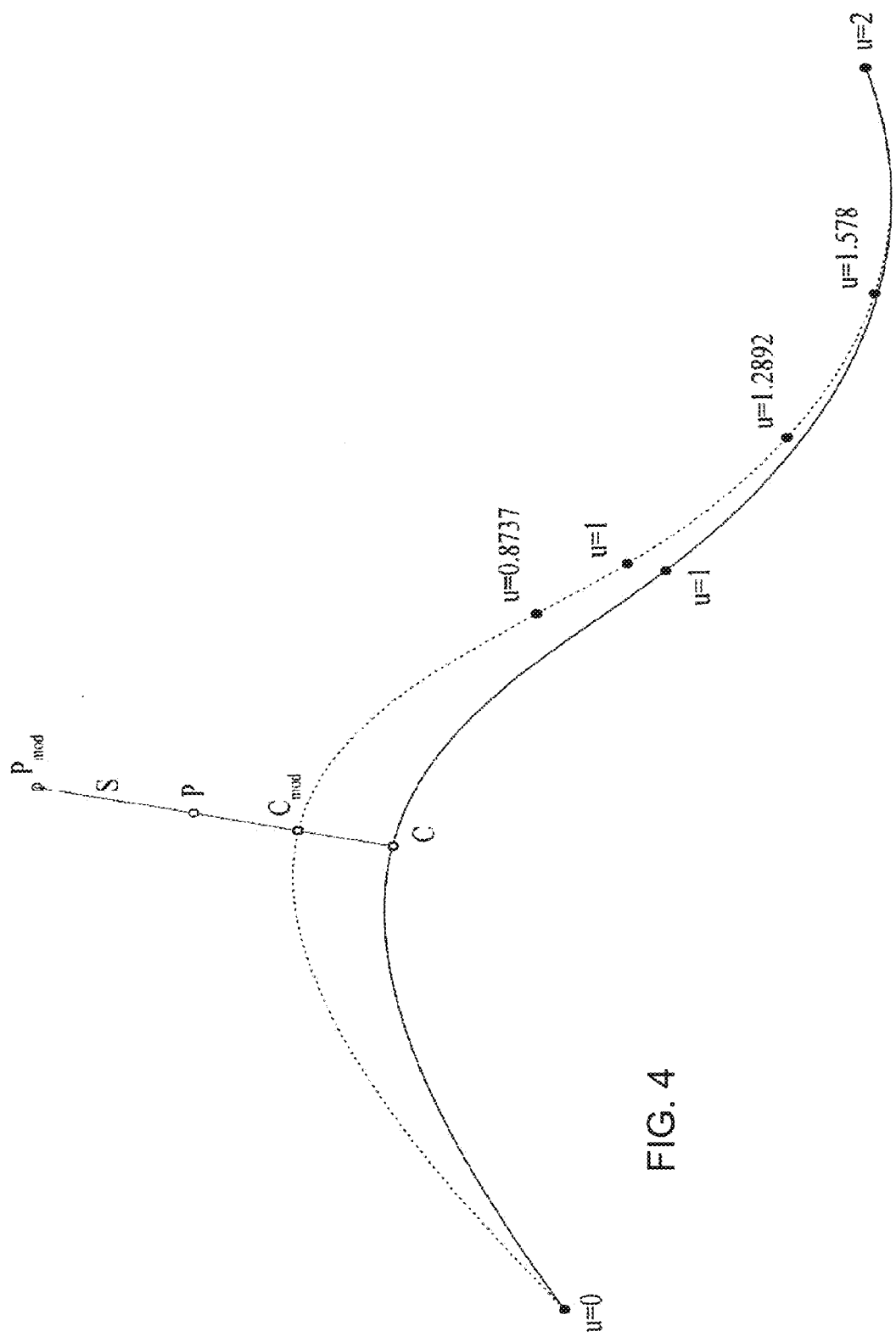
Figure 5:
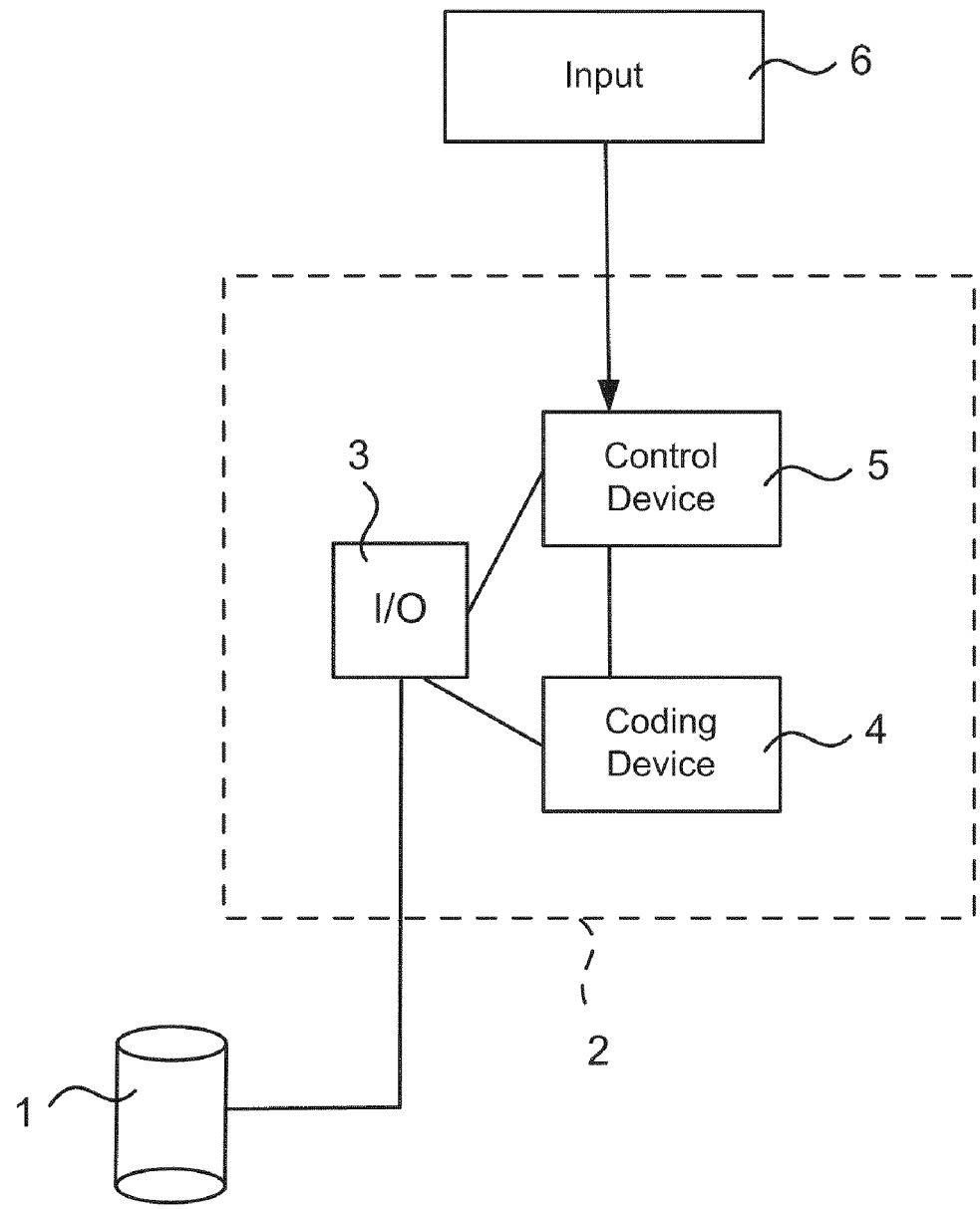
Figure 6:
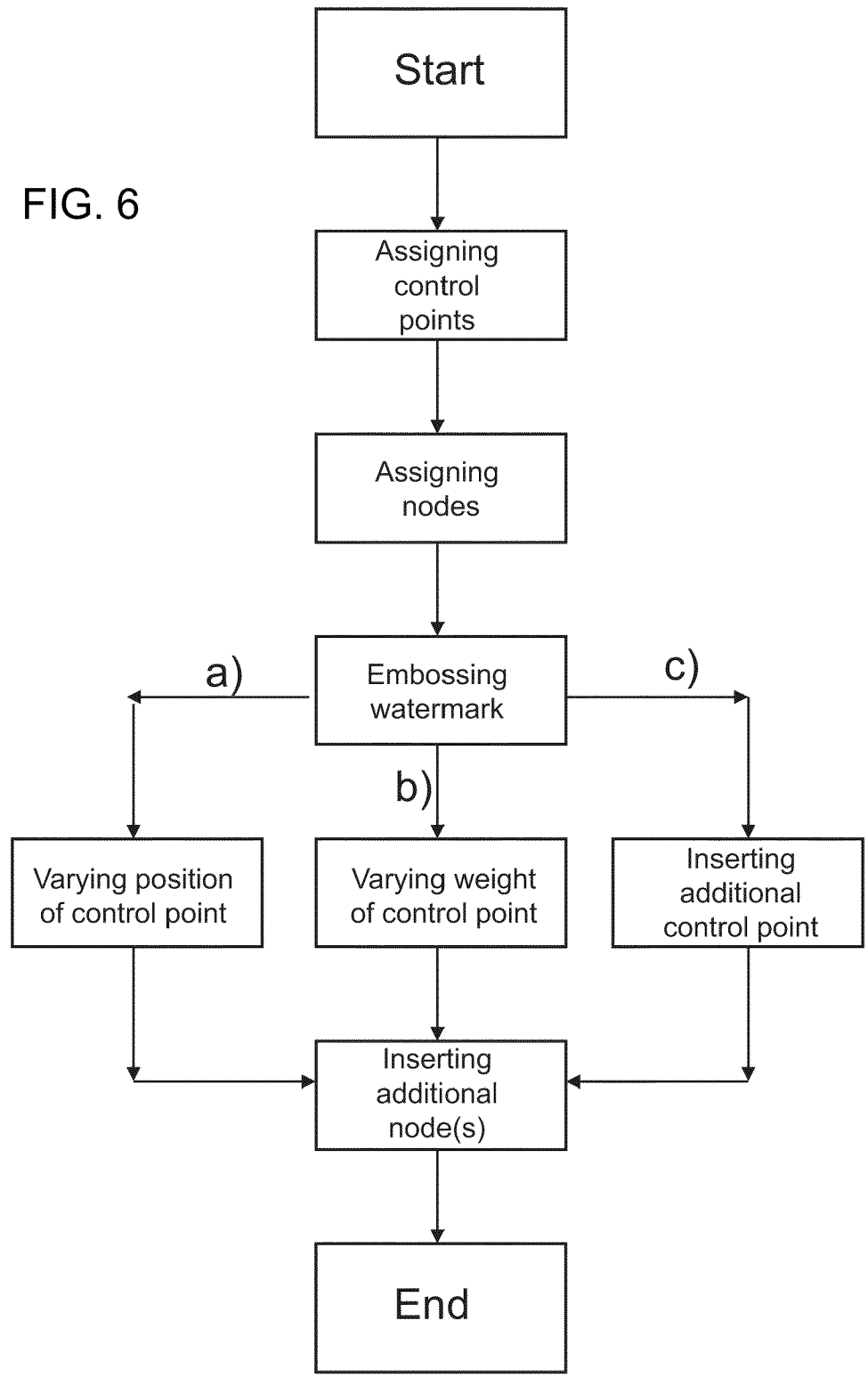

The invention is explained in more detail below with the aid of exemplary embodiments that are illustrated schematically in the figures. However, the invention is not restricted to the examples. All the features of the following description could be combined, individually or in combination with one of the above-described refinements of the invention. In detail, FIG. 1 shows an NURBS curve with an associated control polygon, FIG. 2 shows the NURBS curve in accordance with FIG. 1 with its nodes, FIG. 3 shows an example of the coding of an item of information by changing the weight of a control point, FIG. 4 shows an example of the coding of an item of information by shifting a control point, FIG. 5 shows an arrangement for embossing a watermark, and FIG. 6 shows to a flowchart of the method according to the invention.

The following exemplary embodiments relate to NURBS curves and can be transferred to NURBS surfaces. In the following, each NURBS curve or NURBS surface in the model is designated as an embedded primitive, and the modification of an individual embedded primitive is described. In particular, it is possible for one feature or a number of features of a watermark, for example a digital watermark, to be coded by modifying an embedded primitive in the inventive way. The entire watermark is then formed by the entirety of the modified embedded primitives, or can be detected therefrom. The mode of procedure for embedding (coding) a complete digital watermark will be described later. Firstly, an example for coding a feature in an individual embedded primitive is described.

As already described above, an NURBS curve is defined by a control polygon and a node vector. The control polygon consists of a number of control points. The node vector includes a row of nodes. The control points determine the profile of the curve, while the nodes define the connecting points between adjacent curve segments. FIG. 1 and FIG. 2 show an NURBS curve by way of example. The control polygon, illustrated additionally in FIG. 1, of the curve is illustrated by the dotted lines. A total of five control points lie on the control polygon, specifically at the bend points of the polygon.

Figure 2:
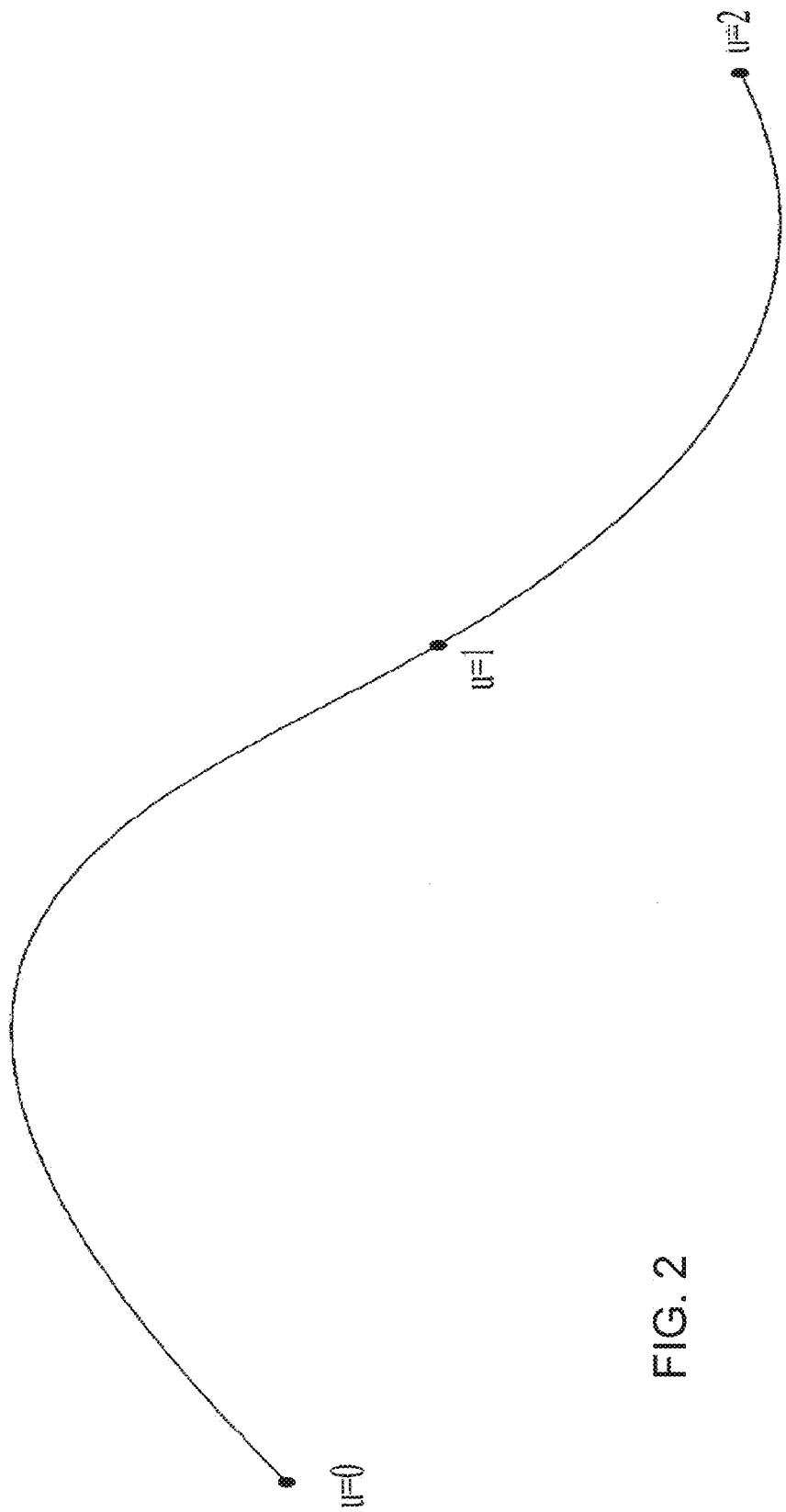

The position of points (the nodes) on the curve (FIG. 2 represented by small solid circles) is determined by the value of a parameter u.

In the example of FIG. 1 and FIG. 2, the NURBS curve $C(u)$ is a curve of third degree that consists of two segments. It is an embedded primitive in the sense of the above definition. The five control points can be placed without restriction of generality in the x-y plane of a Cartesian coordinate system X-Y-Z, and their weights can be set respectively to 1. The corresponding (x,y,z) coordinates of the five control points $P_0$ to $P_4$ are as follows in the example of FIG. 1 and FIG. 2:

$P_0=(-6.680, -5.620, 0)$
$P_1=(-5.205, -4.735, 0)$
$P_2=(-4.601, -6.103, 0)$
$P_3=(-3.541, -6.506, 0)$
$P_4=(-2.991, -6.331, 0)$

The three nodes (FIG. 2) are determined by the node vector $U=\{0,0,0,0,1,2,2,2,2\}$, the first and the last nodes respectively having the multiplicity 4 and the middle node separating the two curve segments. The parameter values of the parameter u, which are the elements of the node vector, are thus $u=0$, $u=1$ and $u=2$.

NURBS surfaces are characterized by two parameters u, v such that a network of control points and two node vectors (one each in the u- and v-directions) results. The following considerations therefore also apply to NURBS surfaces. The geometry (shape) of the NURBS curve is firstly changed during the embedding of a feature of a watermark. Subsequently required information is coded in the NURBS curve in addition to reversing the change. This provides the reversibility of the watermark.

The first step is to describe the change in the geometry.

As mentioned above, a control point can be defined by its spatial coordinates (x, y, z) and by an additional weight. The weight determines how strongly the curve profile approximates the control polygon in the vicinity of the control point. The exemplary embodiment of the invention that is described here changes the weight of the control point, and/or the spatial coordinates of the control point, in order to code an individual feature of the watermark. Tolerances are preferably prescribed for geometric variations in the original NURBS model, and can be exactly observed. For example, the position of the NURBS curve should change locally by not more than a prescribed value. The value can be defined, for example, in the units of the coordinate system used.

The approach of the exemplary embodiment to a solution uses the shifting or the change in the weight of a selected control point of the curve in order to move a reference point on the curve along a fixed direction. The reference point is defined as that point on the curve that lies closest to the control point, or as that point on the curve whose straight connecting line to the control point is perpendicular to the tangent that touches the curve at the reference point.

A key controls the determination of the control point that is used in introducing the feature. In a preferred embodiment, the control point is determined by a pseudo random number that is initialized with a hash value of the key.

A binary feature can therefore be coded as follows:

State A (first bit value): the reference point on the curve was moved in the direction of the control point.

State B (second bit value): the reference point on the curve was moved in the direction away from the control point.

The decision optionally taken, furthermore, as to whether a feature is actually coded in a specific selected embedded primitive is preferably dependent on whether the required shifting of the reference point can be implemented by changing the weight or by shifting the control point. This can be checked in advance before the feature is actually coded. Further criteria such as, for example, curvature dimensions or continuity conditions at the transition between embedded primitives can likewise be included in reaching a decision.

FIG. 3 shows by way of example a particular type of the embodiment of the method by changing the weight of a control point. Another type of execution will be further examined with the aid of FIG. 4.

The setting of the state B is performed by shifting the reference point C on the curve to the point $C_{mod}$ in the direction of the control point P. The modulus d of the shift is given in this type of the design of the method by the Euclidean distance between C and $C_{mod}$. However, it is also possible for other suitable metrics to serve for specifying the shift.

In this case, the reference point on the original curve was selected such that it is the point with the least distance from the selected control point. The selection of the reference point can, however, be done in any other desired defined way.

Coding information in order to invert the geometric change: a reversible watermark method is implemented from the possibility of again reversing the change in geometry without accessing the original (that is to say reproducing the original). The information required to this end is coded in the varied NURBS curve by inserting an additional node into the node vector.

A node span is that part of the curve which lies between two consecutive nodes that are respectively characterized by their parameter value. A parameter value at which an additional node is inserted is selected inside this node span.

In a preferred embodiment of the method, the change in the weight, or the shift of the control point that was required for the change in geometry is coded via the ratio of the lengths of the newly produced node spans. In FIG. 3, a new node is inserted in the node span of length L at the parameter value u=1.1875. This results in two new node spans of length $L_1$ and $L_2$. The ratio of these lengths is set such that it codes the change in the weight or the shift of the control point.

A node can be inserted without changing the shape of the embedded primitive by inserting an additional control point, as described by Piegl and Tiller (L. Piegl et al.: Modifying the shape rational B-splines. Part 1: curves, published in Computer Aided Design 21, 8 (1989), pages 509-518) for NURBS curves and NURBS surfaces. However, other suitable methods can also be selected for inserting a node.

The selection of the node span can be performed by using a key. This key can, but need not, be different from the key used to select the control point. A preferred form of the design is the selection with the aid of a pseudo random number that is initialized with a hash value of the key.

The embedding of a bit (that is to say of the state A or B) into the curve by modifying the weight of a control point, and the shift following therefrom of a reference point on the curve along the connecting line to the control point or away from the latter can be carried out, by way of example, as described below. Here, the shift towards the control point is assigned one state, while the direction away from the control point is assigned the other state. The mode of procedure is explained with the aid of the original curve and modified curve (dotted line) in FIG. 3 using the example of a shift towards the control point.

The numerical values refer to the example in accordance with FIG. 1 and FIG. 2 that was explained above.

1. The control point P to be modified is selected on the basis of a secret key. Use is made here of the control point at the position (−5.205, −4.735, 0).

2. The point on the curve that is closest to the control point P is determined. This is the reference point C.

3. The weight of the control point P is changed such that the new reference point $C_{mod}$ on the modified curve is located at a specific distance d from the reference point C. In the example, d=0.2290 unit.

4. The ratio r of the modulus of the change in the original weight w to the new weight $w_{mod}$ is calculated (in the example, w=1 and $w_{mod}$=2.5):

$$r = \frac{|(w_{mod} - w)|}{w_{mod}} = 0.6$$

5. A node span with a length L of greater than zero is selected on the basis of a secret key and used for coding r. A node span is the half-open interval between 2 nodes, that is to say the parameter range of a segment. The result for the example curve is two useful node spans [0, 1) and [1,2) with a length L greater than zero. Use is made here of the node span [1,2) of length L=1.

6. A new node is inserted into the selected interval such that the upper or lower half of the interval (also denoted below as subintervals) is divided into the two segments $L_1$ and $L_2$ r being coded thereby. Here, the subinterval [1, 1.5) corresponds to the lower half, and the subinterval (1.5, 2) corresponds to the upper half. Using the scaling factor X>2 and $$r = \frac{L_1}{L_2} \text{ and } \frac{L}{X} = L_1 + L_s \text{ yields } L_2 = \frac{L}{X(1+r)}.$$

The result of the above numerical example is that L2=0.3125 with L=1, X=2 and r=0.6. The scaling factor can be selected on the basis of a secret key in order to raise the security level. X=2 was used in the example.

Since r is defined as positive, whereas the change in the weight can also be negative (corresponding to a reduction in the original weight), a specific subinterval for the coding is assigned to a specific change in the sign. This assignment is modulated by a secret key.

In the example, the subinterval [1,1.5) was used, and a node is inserted at u=1.500−0.3125=1.1875.

As shown in the preceding example, the change information required for reversing a weight change (that is to say, in particular, a coding of an individual bit) of an individual control point can be coded by inserting a single node. The ratio of actual coded information (here 1 bit) and additional node is thus 1:1. However, this is not necessarily so. However, the ratio can differ for different embodiments of the invention. For example, it is 1:3 in the following exemplary embodiment.

The alternative embedding of the feature by shifting a control point is explained with the aid of FIG. 4:

The embedding of a bit (that is to say of the state A or B) into the curve by shifting a control point, and the shift resulting therefrom of a reference point on the curve along the connecting line toward the control point or away therefrom can be carried out by way of example, as described below. In this case, the shift toward the control point is assigned one state, while the direction away from the control point is assigned the other state.

1. The control point P to be modified is selected on the basis of a secret key. Here, use is made of the control point at the position (−5.205, −4.735, 0).
2. The point on the curve that is closest to the control point P is determined. This is the reference point C.
3. The control point P is shifted to $P_{mod}$ such that the new reference point $C_{mod}$ is located on the modified curve at a specific distance d from the reference point C. In the example, d=0.2290 units. The control point was shifted from
P=(−5.205, −4.735, 0) by d=0.3819 units to
$P_{mod}$=(−5.126, −4.361, 0)
4. The shift vector S from P to $P_{mod}$ is composed of the three components $S_x$, $S_y$, and $S_z$. Here, S=(0.07848, 0.3737, 0).
5. Each of the three components of the shift vector are coded individually via the insertion of a node. The three nodes are correspondingly inserted into the embedded primitives. On the basis of a secret key, a node span with a length L of greater than zero is consecutively selected for each node to be inserted, and is used for coding. The nodes are inserted into the selected node spans consecutively.
6. A new node is respectively consecutively inserted into each selected interval such that the upper or lower half (in a sense of the rising parameter value u) of the interval is divided in the two segments $L_1$ and $L_2$, and the component of the shift vector is coded thereby. Since the component of the shift vectors can be positive or negative, a specific half (also denoted below as subinterval) is used for the coding, depending on signs. This assignment is modulated by a secret key.

In the example, the upper half of the interval [1,2] was used for the first component of the shift vector, and a node was inserted at $u=1.5+0.07848=1.57848.$ The upper half of the interval [0,1] was selected for the second component, and a node was inserted at $u=0.5+0.3737=0.8737.$ The third component is zero, and the interval (1,1.57848) was selected, and so a node was inserted at $u=1.289+0=1.289.$ It has previously been described how a feature (here: a bit) is introduced into an embedded primitive. However, it is also possible for a number of features (for example a number of bits) to be coded in an embedded primitive. In this case, it is preferably ensured that the features do not influence one another mutually, or do so only very slightly. This can be achieved by proper selection of control points inside the embedded primitive, since the change in the weight of a control point $P_t$ has an effect only in a restricted region of the curve. This consideration also applies to NURBS surfaces.

If necessary, further control points and nodes can be inserted into the curve before the embedding such that the shape of said curve is not changed, or is only slightly changed, by the application of the previously described embedding method.

Additional control points can also serve the purpose of raising the security of the method. These control points and nodes can be inserted before or after the embedding method has been carried out.

The positions at which new control points and nodes are inserted can be controlled via a secret key.

A preferred form of the design is the insertion of nodes as described by Les Piegl, Wayne Tiller: "The Nurbs Book" ($2^{nd}$ edition), Springer Verlag, January 1997, ISBN 3540615458, for NURBS curves and NURBS surfaces. The same technique can also be applied if further nodes are required for coding the information in order to reverse the embedding process.

The following description relates to the detection of a feature in a spline model, that is to say the process of identifying the coded information and (optionally) the reversal.

In the field of digital watermarks, a distinction is made between blind and nonblind methods. By contrast with blind methods, in addition to the data record of the changed model nonblind methods require the original, unchanged data record (or data from which the unchanged data record can be determined) in order to verify the digital watermark.

The present invention embraces both blind and nonblind methods. Examples are yet to be given. The blind method can be executed such that the digital watermark is removed from the changed model, and so that the original one is produced again.

The blind method is preferably carried out whenever the changed (marked) model is present in its original, NURBS-based representation.

Evaluation of a feature is carried out as follows:
1. If control points and (further) nodes are still being inserted after carrying out the embedding method, these are firstly removed. If it is necessary, the selection of these control points and nodes is performed with the aid of a key.
2. Node span and control point are now selected in the embedded primitive, if required on the basis of the appropriate key. As mentioned above, node span and control point can be defined by selecting a common key or a respectively different key.
3. The change in the original weight of the control point, or the shift of the control point is yielded in the preferred form of the design of the method by evaluating the lengths $L_1$ and $L_2$, extracted from the node vector, of the node spans generated during the embedding process (see above). The change in the weight can be used to decide whether state A or state B has been coded.

If the change introduced by the embedding process is to be reversed again, the following steps are carried out subsequently to step 3.
4. The additional node inserted during the embedding of the feature is removed.
5. The original weight of the control point is reset, or the control point is shifted back to its original position.

If a number of features have been coded in the embedded primitive, step 2 to step 5 of the sequence specified above are respectively carried out for each embedded feature. Step 1 is executed only once per embedded primitive.

A preferred form of the design of the removal of nodes is described by Piegl and Tiller (see above) for NURBS curves and NURBS surfaces.

The detection and reversal of the variation will now be described below with the aid of two exemplary embodiments and with reference to the above numerical examples. The first example relates to the above described coding by varying a weight, while the other refers to the coding by shifting a control point.

The parameter range that was used for coding r is selected on the basis of the secret key that was used during embedding. Here, the range [1,2) of length L=1 was used. The node that codes r lies within this range. The example uses the value of $L_2$=1.500−1.1875=0.3125, which lies in the lower half of the original node span [1,2).

The assignment between subinterval and sign of the change in the weight is demodulated with the aid of the secret key that was used during embedding. It is thereby possible for the sign of the change in weight, and therefrom the embedded state, to be derived together with the position of the detected node.

If the original embedded primitive is to be produced again, the modified control point P is selected on the basis of the secret key used during embedding. The control point at the position (−5.205, −4.735, 0) was used here.

Using the and the known scaling factor X=2 and $$r = \frac{L}{XL_2} - 1 = \frac{1}{2 \cdot 0.3125} - 1 = 0.6,$$

the magnitude of the difference between the original and known modified weight $w_{mod}$=2.5 is yielded from $$|(w_{mod}-w)|=_{mod}r = 2.5 \cdot 0.6 = 1.5.$$

The original weight w=2.5−1.5=1 is yielded together with the information relating to the sign. The node is removed (here, the node at u=1.1875), and the weight of the control point is reset to its original value, here w=1.

There now follows the example that relates to the coding of a feature by modification of a control point.

The parameter ranges that were used to code the components of the shift vector S are selected consecutively in inverse sequence of the embedding, on the basis of the secret key that was used during embedding.

The third component was coded in the interval [1,1.578). A node is found precisely in the middle of the interval at u-1.289, thus yielding $S_z$=0. The node is removed.

The second component was coded in the interval [0.1]. A node is detected at u=0.8737. The node is removed. The result is $$S_y = 0.8737 - 0.5 = 0.3737.$$

The first component of the shift vector was coded in the interval [1,2), and a node is detected at 1.57848. The result is $$S_x = 1.57848 - 1.5 = 0.07848$$

For each of the three nodes, the assignment between subinterval and sign of the change in the weight is demodulated with the aid of the secret key that was used during embedding. This results in the shift vector S of (0.07848, 0.3737, 0). The modified control point $P_{mod}$ is selected on the basis of the secret key used during embedding. Here, the control point at the position (−5.205, −4.735, 0) was used. The shift vector S yields the direction of the shift, and thus the embedded state.

If the original embedded primitive is to be produced again, the node at 1.57848 is removed and the original control point is produced again:

$$P = P_{mod} - S.$$

If the embedded primitive to be evaluated is not in its original NURBS form of representation, but in another 3-dimensional form of representation (for example as a polygonal model), the evaluation of a feature can be carried out if the original model is present for comparison. The method can be applied both to the embedded primitives modified by changing the weight, and to those modified by shifting the control point.

In many cases of application, the requirement for the original model constitutes only a minor restriction on the applicability of the method, since in many instances a master model is used, and there is therefore no need for disproportional outlay on finding the original model.

In the case of the detection of a bit, the decision as to whether state A or state B has been coded is taken with the aid of the position of a feature in the model to be examined in relation to the original model. This is successful with a curve model just as with a surface model:

1. The control point P in the original model is selected with the aid of the same key that was also used for embedding.
2. The reference point C on the original curve is determined in a similar manner to the embedding algorithm.
3. The position of the reference point $C_{mod}$ on the curve to be evaluated is yielded as the point of intersection between the straight point through P and C and the curve to be evaluated.
4. State A is coded if $C_{mod}$ is shifted toward P. State B is coded if a shift away from P has been established. No feature can be detected if C and $C_{mod}$ coincide. Note: if, in another embodiment of the invention, not a digital value (bit) but an analog value has been coded, the sign of the shift can be determined in step 4.
5. In the preferred form of the design of the method (in the case of which a digital value has been coded), the measured Euclidean distance between C and $C_{mod}$ can serve as additional criterion for reliability of the detection. The closer the Euclidean distance lies to the shift d used during embedding, the more likely is a correct detection. Instead of the Euclidean distance, it is also possible here to make use of other suitable metrics. Note: if no digital value was coded in the case of another embodiment of the invention, the shift and thus the coded information result from the Euclidean distance together with the sign.

For the nonblind detection, it is possible in the course of the embedding process to store (in particular in the data record of the model) additional information in the form of the control points used for embedding, the point on the curve that is closest to the respective control point, and the direction of the shifting of the curve at this point (toward the control point, or away therefrom).

The numerical example for nonblind detection will now be completed.

In the present example described above, the control point P=(−5.205, −4.735, 0), the next point on the curve is C=(−5.304, −5.209, 0), and the direction of the shift runs from C to P. The state that is described by this information can be verified by determining the point of intersection of the curve with a ray running from C along the shift direction to P. If a point of intersection is found and lies within a specific tolerance span about the original shift (in example d=0.2290), the state is held to have been verified.

If the embedded primitive to be evaluated is part of a rendered display (that is to say an image), it is possible under specific boundary conditions to check in the rendered display as to whether a feature in an embedded primitive codes state A or state B. A precondition for this is that the original model be present for comparison.

The basic idea consists in carrying out an image comparison between the image to be evaluated and a rendered display of a known, marked version of the original model. The marked version of the original model is displayed in this case in a way that is as congruent as possible with the image to be evaluated.

The congruence between a rendered version of the original model and image to be evaluated can be achieved, for example, by photogrammetric methods.

If the rendered display of the known embedded primitive comes sufficiently accurately close to the corresponding embedded primitive in the image to be evaluated, the feature in the embedded primitive is held to have been verified.

The coding of a plurality of features into a model will now further be examined below.

The embedded primitives included in the NURBS model are arranged in accordance with a defined sequence and treated sequentially one after another. In particular, the embedded primitives are enumerated. The embedded primitives can, however, also be combined into groups in order, for example, to use topological information during the process of embedding and detection.

In order to enhance the reliability of the method, the sequence is preferably generated on the basis of a secret key. This key can, but need not, correspond to the keys used during the embedding process occurring later. A preferred form of design is the generation of a sequence of pseudo random numbers that is initialized with a hash value of the key.

The information that is coded by the digital watermark can be expressed as a sequence of individual bits. Depending on the size of the model and the desired robustness of the digital watermark, individual bits of the bit sequence, parts of the bit sequence, or the entire bit sequence can be introduced several times (redundantly) into the model. The bit sequence can additionally be specially coded before being embedded into the model. Here, for example, use may be made of methods for error recognition and error correction.

The above described method can be used, for example, to code one or more bits of the bit sequence per embedded primitive by means of binary features. One subset or the total set of all the embedded primitives contained in the model is used in order to code the entire bit sequence or parts of the bit sequence in the model. To this end, the embedded primitives are processed in accordance with the defined sequence and treated with the aid of the above described embedding method.

In order to enhance security of the method, the change information, which is assigned to a specific embedded primitive or a number of embedded primitives, can be coded in another embedded primitive. That is to say, the variation in the shape does not occur in the same embedded primitive as the coding of the change information. The selection of the corresponding embedded primitives is performed, for example, with the aid of a secret key.

It is preferred to use the above described blind detection method for detecting the watermark (here: the bit sequence) when the model to be examined is present in the original spline form of representation.

The embedded primitives are then processed, in particular, in the same sequence as during the embedding. In order to calculate the correct sequence, there may be a need for the same key as was used during the embedding process.

The features introduced into the embedded primitives are read out appropriately, and the bit sequence is reconstructed (and optionally decoded). If the watermark is to be removed from the model, the changes in the embedded primitives are appropriately reversed.

If the model to be examined is present in another 3D form of representation, there is generally a need for a preprocessing step in order to align it as exactly as possible with the original model. Operations of this type are denoted as registration methods. Every suitable registration method can be used for 3D models. For example, use may be made here of the method described by Praun in: Praun E., Hoppe H., Finkelstein A.: Robust Mesh Watermarking. Proceedings of the Conference on Computer Graphics (SIGGRAPH '99), ACM Press, pages 49-56.

Subsequently, the features introduced into the embedded primitives are read out, and the bit sequence is reconstructed and decoded. The embedded primitives are processed, in this case, in the same sequence as during the embedding. In order to calculate the correct sequence, there may be a need for the same key as was used during the embedding process.

If the model to be examined is present in a rendered representation, the rendering parameters are firstly determined as precisely as possible. Subsequently, the watermark introduced into the model is verified via image comparisons.

The parameters of the rendering process that were used in order to generate the image to be evaluated from the model are generally unknown and are therefore firstly determined as precisely as possible:

Rendering parameters such as illumination setting, surface properties and shading models (Gouraud, Phong, etc.) can generally only be estimated.

The camera position determines the view of the model that is displayed in the image. It is particularly important to determine it as precisely as possible, since it is decisive for the quality of the congruence between the image pairs. The determination of the camera position can be performed, for example, with the aid of photogrammetic methods with high accuracy. A possible design is the comparison of corresponding pass points in the image to be evaluated and the original model, as is described, for example, by Hartley and Zisserman in: Hartley R., Zisserman A.: Multiple View Geometry. Cambridge University Press (2003).

All supplied versions of the model that have been provided with a watermark are either produced anew from the original model, or are read out from a data memory and rendered in accordance with the camera parameters determined. The pairwise image comparison of all images thus generated with the image to be examined supplies the best comparison value for the correct watermark. Suitable for being applied as comparison methods are methods for determining the similarity between images. For example, a neural network can be trained with the aid of the rendered versions of the marked model, and serve as classifier for the image to be examined.

FIG. 5 shows an embodiment of an arrangement for embossing a watermark. Data of a model are stored in a data memory 1, which is connected to a variation device 2. The variation device 2 has an input/output device 3 that is configured for reading data into and out of the data memory 1. The input/output device 3 is connected, in turn, to a coding device 4 by means of which the coding of the data of the model, that is to say the embossing of the watermark, is performed. The coding device 4 is controlled by a control device 5 which, in turn, can access the data in the data memory 1 via the input/output device 3. Moreover, an input means 6 (for example a keyboard) can act from outside on the control device 5.

The invention leads to the following advantages by comparison with the prior art, referred here to the specific case of applying NURBS models:

By using established modeling techniques for NURBS curves and NURBS surfaces, which are based on modification of the weights of control points, it is possible for the robustness of the digital watermark and the intensity of the changes at a NURBS model by the watermark to be weighed optimally one against another.

The invention enables a robust digital watermark to be introduced into NURBS models. The robustness is implemented by changes in the external shape, that is to say the geometry of the NURBS model.

The controlled change in the outer shape enables the detection of a digital watermark in other forms of representation.

In particular, boundary conditions with regard to the permitted changes in geometry can be observed simultaneously.

A further decisive advantage of the described method is the possibility of the complete reversibility of changes, introduced by the digital watermark, at the NURBS model without knowledge of the original (for example in combination with a blind method of detection). In many cases, it will be this property that first enables as far as possible the use of a digital watermark for NURBS-based CAD models.

The invention claimed is:

1. A method for designing industrial goods, which comprises:
   designing a linear or surface shape of an item by embossing a watermark into a model of the linear or surface shape, the model having a plurality of splines that form the shape in a totality thereof;
   assigning control points to the splines to render it possible to vary, and thereby control, a profile of a respectively assigned spline by varying a position of the control points; and
   assigning nodes to the splines, the nodes lying on a part of the shape formed by the respectively assigned spline, and varying the shape by performing one or more of the following steps a) to c) during embossing of the watermark into the model:
   a) varying the position of at least one control point;
   b) varying, for at least one control point, a weight with which the control point affects the shape and thus influences at least one area of the shape;
   c) inserting at least one additional control point into the model; and
   introducing an item of variation information relating to how the variation in the shape can be reversed by inserting at least one additional node into the model.

2. The method according to claim 1, which comprises prescribing a binary code with at least one bit that is intended to be coded by embossing the watermark into the model, wherein the bit is able to assume a first value and a second value, and the bit is coded by a local displacement of the shape transverse to a profile of the shape by executing one or more of the steps a) to c), such that the local displacement in a first direction codes the first value, and the local displacement in a second direction, opposite to the first direction, codes the second value.

3. The method according to claim 1, wherein the industrial goods are motor vehicle bodies.

4. A manufacturing control system, comprising: a control device for controlling a production of an item, said control device being configured to evaluate a model by performing the steps of claim 1 and to generate control commands that prompt a production device to produce the item shaped in accordance with the model, and wherein said control device has an extraction device configured in such a way that the variation information is evaluated automatically with the aid of the additional node/nodes and the variation in the shape is reversed.

5. The method according to claim 1, which comprises using a key in effecting a logical assignment of a control point used in executing one or more of the steps a) to c) to the additionally inserted node with the aid of which the variation information corresponding to the variation via the control point is introduced into the model.

6. An assembly for designing industrial goods, comprising:
   a device for designing a linear or surface shape of an item and thereby embossing a watermark into a model of the linear or surface shape, the model having a plurality of splines that form the shape in a totality thereof, the splines being assigned control points such that it is possible to vary, and thereby control, a profile of the respectively assigned spline by varying the position of the control points and/or of weights of the control points, and the splines being assigned nodes that lie on a part of the shape formed by the respectively assigned spline; and
   a variation device configured to vary the shape by one or more of the following measures during embossing of the watermark into the model:
   a) a position of at least one control point is varied;
   b) a weight with which a control point affects the shape and thus influences at least one area of the shape is varied for at least one control point; or
   c) at least one additional control point is inserted into the model;
   said variation device introducing an item of variation information relating to how the variation in the shape can be reversed by inserting at least one additional node into the model.

7. The assembly according to claim 6, further comprising a data interface connected to said variation device for enabling control information to be fed in for controlling the variation.

8. The assembly according to claim 7, wherein the control information is at least one of a binary code and a key from which a rule can be derived as to how the variation and/or the variation information is to be coded.

9. The assembly according to claim 6, configured to produce motor vehicle bodies.

* * * * *